US011801422B2

(12) United States Patent
Chen et al.

(10) Patent No.: US 11,801,422 B2
(45) Date of Patent: Oct. 31, 2023

(54) WEARABLE POSITIONING DEVICE AND WEARABLE POSITIONING METHOD

(71) Applicant: INSTITUTE FOR INFORMATION INDUSTRY, Taipei (TW)

(72) Inventors: Chun Chen, Taipei (TW); Chih-Hung Shih, Taipei (TW); Yu Hung Chiang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 224 days.

(21) Appl. No.: 17/500,961

(22) Filed: Oct. 14, 2021

(65) Prior Publication Data

US 2023/0069470 A1 Mar. 2, 2023

(30) Foreign Application Priority Data

Aug. 27, 2021 (TW) .................. 110131932

(51) Int. Cl.
*A63B 24/00* (2006.01)
*G01C 21/16* (2006.01)
(Continued)

(52) U.S. Cl.
CPC .......... *A63B 24/0062* (2013.01); *G01C 21/16* (2013.01); *A63B 2220/12* (2013.01);
(Continued)

(58) Field of Classification Search
CPC ............ A63B 24/0062; A63B 2220/12; A63B 2220/20; A63B 2220/34; A63B 2220/40; A63B 2220/836; A63B 2225/50; A63B 2225/60; A63B 2244/20; G01C 21/16; G01C 21/20; G01S 19/19; G01S 19/49; G08B 21/088; H04L 67/10; H04L 67/12
See application file for complete search history.

(56) References Cited

U.S. PATENT DOCUMENTS 10,486,025 B1 * 11/2019 Shau ................. H04R 1/028
2007/0006472 A1 1/2007 Bauch
(Continued)

FOREIGN PATENT DOCUMENTS

CN 111388987 A 7/2020
TW 201145220 A1 12/2011

*Primary Examiner* — Behrang Badii

(57) ABSTRACT

A wearable positioning device includes an inertial sensor, a storage device and a processor. The inertial sensor senses an acceleration signal and an angular velocity signal. The storage device stores a previous positioning signal and a current coordinate. The processor is electrically connected to the inertial sensor and the storage device. A wearable positioning method is executed by the processor, which includes: determining whether the wearable positioning device is in one of an under-water mode and an above-water mode according to a pressure sensing signal; calculating, when in the under-water mode, a current acceleration and a current direction according to the acceleration signal, the angular velocity signal, and a swimming posture signal representing a swimming posture; and calculating a current positioning signal according to the current acceleration, the current direction and the previous positioning signal, and updating the current coordinate with the current positioning signal.

14 Claims, 2 Drawing Sheets

(51) Int. Cl.
*H04L 67/10* (2022.01)
*H04L 67/12* (2022.01)
*G08B 21/08* (2006.01)
*G01S 19/49* (2010.01)
*G01S 19/19* (2010.01)

(52) U.S. Cl.
CPC ....... *A63B 2220/20* (2013.01); *A63B 2220/34* (2013.01); *A63B 2220/40* (2013.01); *A63B 2220/836* (2013.01); *A63B 2225/50* (2013.01); *A63B 2225/60* (2013.01); *A63B 2244/20* (2013.01); *G01S 19/19* (2013.01); *G01S 19/49* (2013.01); *G08B 21/088* (2013.01); *H04L 67/10* (2013.01); *H04L 67/12* (2013.01)

(56) References Cited

U.S. PATENT DOCUMENTS

| | | | |
|---|---|---|---|
| 2018/0028863 A1* | 2/2018 | Matsuda | G01C 21/14 |
| 2018/0348519 A1* | 12/2018 | Lee | A63B 33/002 |
| 2022/0291393 A1* | 9/2022 | Gum | G01S 19/48 |

* cited by examiner

WEARABLE POSITIONING DEVICE AND WEARABLE POSITIONING METHOD

CROSS-REFERENCE TO RELATED APPLICATIONS

This application claims the benefit of priority from the prior Taiwanese Patent Application No. 110131932, filed Aug. 27, 2021, the entire contents of which are incorporated herein by reference.

FIELD OF THE INVENTION

The present invention relates to a wearable positioning device, and more particularly to a wearable positioning device and a wearable positioning method for above-water and under-water positioning.

BACKGROUND OF THE INVENTION

In view of the fact that when swimming enthusiasts are engaged in outdoor water activities, such as swimming across rivers or lakes, wireless signals and positioning signals on or under the water surface are easily interfered, and it is difficult for swimming enthusiasts to use wearable positioning devices for positioning and tracking. Therefore, it is difficult to ensure the safety of swimming enthusiasts when engaging in water sports. Therefore, there is a need for a wearable positioning device and a wearable positioning method that can be used for above-water and under-water positioning.

SUMMARY OF THE INVENTION

The invention provides a wearable positioning device and a wearable positioning method, which can be used for real-time positioning on and under the water surface, so as to improve the safety of swimming enthusiasts in water activities.

The wearable positioning device provided by the present invention includes an inertial sensor, a storage device and a processor. The inertial sensor is configured to sense an acceleration signal and an angular velocity signal. The storage device is configured to store a previous positioning signal and a current coordinate. The processor is electrically connected to the inertial sensor and the storage device and configured to perform the following operations: determining whether the wearable positioning device is in one of an under-water mode and an above-water mode according to a pressure sensing signal; calculating, when in the under-water mode, a current acceleration and a current direction according to the acceleration signal, the angular velocity signal, and a swimming posture signal representing a swimming posture; and calculating a current positioning signal according to the current acceleration, the current direction and the previous positioning signal, and updating the current coordinate with the current positioning signal.

The wearable positioning method provided by the present invention is suitable for a wearable positioning device. The wearable positioning device includes an inertial sensor, a storage device and a processor. The inertial sensor is configured to sense an acceleration signal and an angular velocity signal. The storage device is configured to store a previous positioning signal and a current coordinate. The processor is electrically connected to the inertial sensor and the storage device. The wearable positioning method includes steps of: determining whether the wearable positioning device is in one of an under-water mode and an above-water mode according to a pressure sensing signal; calculating, when in the under-water mode, a current acceleration and a current direction according to the acceleration signal, the angular velocity signal, and a swimming posture signal representing a swimming posture; and calculating a current positioning signal according to the current acceleration, the current direction and the previous positioning signal, and updating the current coordinate with the current positioning signal.

In an embodiment of the present invention, the processor is further configured to perform the following operations: receiving, when in the above-water mode, a first positioning signal and calculating a distance between the current coordinate and a coordinate corresponding to the first positioning signal; and determining whether the distance is less than or equal to a threshold value, and updating the current coordinate with the first positioning signal when the distance is less than or equal to the threshold value.

In an embodiment of the present invention, the processor does not update the current coordinate with the first positioning signal when the distance is greater than the threshold value.

In an embodiment of the present invention, the processor is configured to calculate the distance according to the acceleration signal and the angular velocity signal.

In an embodiment of the present invention, the processor is configured to use the acceleration signal, the angular velocity signal and the corresponding swimming posture as training data to generate a swimming posture determination model, and use the swimming posture determination model to determine the swimming posture to generate the swimming posture signal representing the swimming posture.

In an embodiment of the present invention, the aforementioned wearable positioning device further includes a pressure sensor, electrically connected to the processor and configured to sense the pressure sensing signal and transmitting the pressure sensing signal to the processor.

In an embodiment of the present invention, the aforementioned wearable positioning device further includes a communication device, electrically connected to the processor and configured to transmit the current coordinate to a cloud server.

The present invention uses a pressure sensor to sense that the wearable positioning device is in the above-water mode or the under-water mode. When in the under-water mode, the current coordinate of the wearable positioning device is calculated according to the acceleration signal and the angular velocity signal of the inertial sensor and the swimming posture signal determined by the processor according to the swimming posture determination model. Alternatively, when in the above-water mode, the current coordinate of the wearable positioning device is determined by comparing the distance between the coordinate corresponding to the positioning signal and the current coordinate. That is, the wearable positioning device and method thereof provided by the present invention can be used for real-time positioning on and under the water surface and sending the current coordinate, thereby achieving the effect of improving the safety of swimming enthusiasts engaged in water activities.

In order to make the above and other objects, features, and advantages of the present invention more comprehensible, embodiments are described below in detail with reference to the accompanying drawings, as follows.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
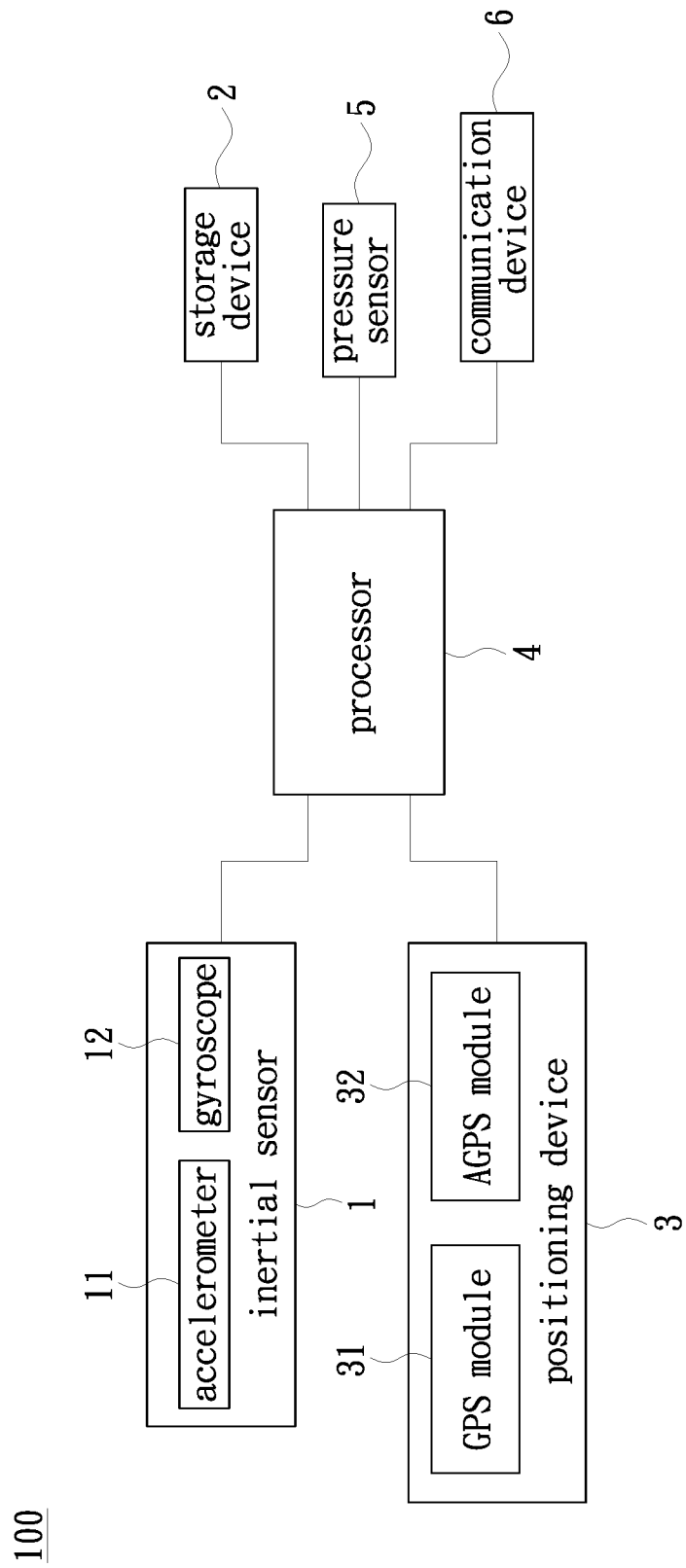
FIG. 1 is a system block diagram of a wearable positioning device according to an embodiment of the present invention.

Please refer to FIG. 1, which is a system block diagram of a wearable positioning device according to an embodiment of the present invention. The wearable positioning device 100 of FIG. 1 includes an inertial sensor 1, a storage device 2, a positioning device 3, a processor 4, a pressure sensor 5 and a communication device 6. The processor 4 is electrically connected to the inertial sensor 1, the storage device 2, the positioning device 3, the pressure sensor 5 and the communication device 6.

In the wearable positioning device 100 shown in FIG. 1, the inertial sensor 1 includes an accelerometer 11 and a gyroscope 12. The accelerator 11 is configured to sense an acceleration signal of the wearable positioning device 100 and transmit the acceleration signal to the processor 4. The gyroscope 12 is configured to sense an angular velocity signal of the wearable positioning device 100 and transmit the angular velocity signal to the processor 4. The positioning device 3 includes a global positioning system (GPS) module 31 and an assisted global positioning system (AGPS) module 32 for calculating a positioning signal of the wearable positioning device 100 and transmitting the positioning signal to the processor 4.

In the wearable positioning device 100 of FIG. 1, the storage device 2 is configured to store the previous positioning signal, the previous coordinate, the current positioning signal and the current coordinate of the wearable positioning device 100. The pressure sensor 5 is configured to sense the pressure sensing signal and transmit the pressure sensing signal to the processor 4. The communication device 6 is configured to transmit the current coordinate to a cloud server (not shown). The communication device 6 is a wireless network technology that uses the Internet of Things (IoT) for long-distance communication, such as a low-power wide area network (LPWAN) technology.

In the wearable positioning device 100 of FIG. 1, the processor 4 is configured to use the acceleration signal, the angular velocity signal and the swimmer's swimming posture as training data to generate a swimming posture determination model, and use the swimming posture determination model to determine a swimmer's swimming posture, thereby generating a swimming posture signal representing the swimming posture of the swimmer.

Figure 2:
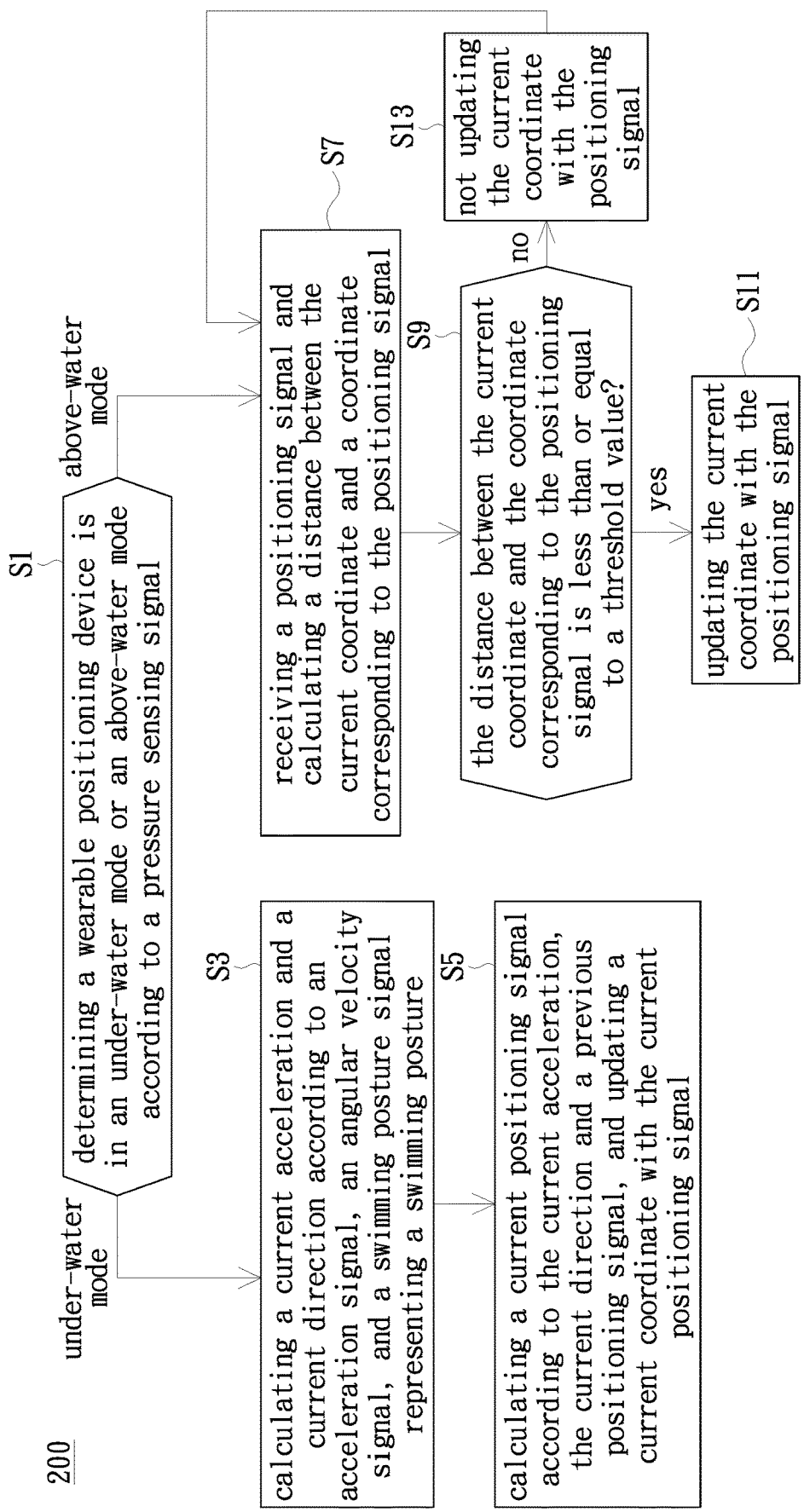
FIG. 2 is a flowchart of a wearable positioning method according to an embodiment of the present invention.

Please refer to FIG. 2, which is a flowchart of a wearable positioning method according to an embodiment of the present invention. The wearable positioning method 200 of FIG. 2 is applicable to the wearable positioning device 100 and is executed by the processor 4 in the wearable positioning device 100.

As shown in FIG. 2, in step S1, the processor 4 determines that the wearable positioning device 100 is in an under-water mode or an above-water mode according to the pressure sensing signal. In one embodiment, the pressure sensor 5 generates a pressure sensing signal when a swimmer wears the wearable positioning device 100 for swimming, and the processor 4 determines that the wearable positioning device 100 is under the water surface or above the water surface according to the pressure sensing signal. The processor 4 determines that the wearable positioning device 100 enters the under-water mode when receiving the pressure sensing signal and determining that the wearable positioning device 100 is under the water surface. Alternatively, the processor 4 determines that the wearable positioning device 100 enters the above-water mode when receiving the pressure sensing signal and determining that the wearable positioning device 100 is above the water surface.

In step S3, when determining that the wearable positioning device 100 enters the under-water mode, the processor 4 calculates the current acceleration and the current direction according to the acceleration signal, the angular acceleration signal, and the swimming posture signal representing the swimming posture. Specifically, the processor 4 uses the trained swimming posture determination model to determine the swimming posture, such as breaststroke, freestyle, butterfly, backside, etc., and generates the corresponding swimming posture signal, wherein the swimming posture signal is the acceleration value of the corresponding swimming posture. Then, after obtaining the acceleration signal, the angular acceleration signal and the acceleration value of the swimming posture, the processor 4 calculates the average acceleration as the current acceleration value according to the time of the wearable positioning device 100 under water, the acceleration value in the acceleration signal and the angular acceleration value in the angular acceleration signal, and calculates the moving distance vector as the current direction at the same time.

In step S5, the processor 4 calculates the current positioning signal according to the current acceleration, the current direction and the previous positioning signal of the wearable positioning device 100, and updates the current coordinate with the current positioning signal. Specifically, the positioning device 3 cannot receive the positioning signal when the wearable positioning device 100 is in the under-water mode, therefore, the processor 4 estimates the current positioning signal as the current coordinate based on the previous positioning signal and according to the current acceleration and the current direction. In addition, it should be noted that the previous positioning signal comes from the positioning signal received by the positioning device 3 in the above-water mode or the positioning signal estimated by the processor 4 in the under-water mode.

In one embodiment, it is assumed that the coordinate (x, y) corresponding to the previous positioning signal of the swimmer is (0, 0), the time that the wearable positioning device 100 is in the under-water mode is from the 0th to the 5th second, the acceleration constant value for the breaststroke is (0.7, 0.5), and the inertial sensor 1 senses the acceleration every 0.01 second. Thus, the processor 4 can calculate the average acceleration value (e.g., (0.1, 0.04)) according to the acceleration value between the 0th and 5th seconds, calculate the movement distance (e.g., (0.1, 0.04)× 5=(0.5, 0.2)) of the 0th second to the 5th second, and then calculate the current positioning signal (e.g., (0, 0)+(0.5× 0.7, 0.2×0.5)=(0.35, 0.1)) as the swimmer's current coordinate in the fifth second.

In step S7, when the processor 4 determines that the wearable positioning device 100 enters the above-water mode, the positioning device 3 receives the positioning signal and the processor 4 calculates the distance between the current coordinate of the wearable positioning device 100 and the coordinate corresponding to the positioning signal.

In step S9, the processor 4 determines whether the distance between the current coordinate of the wearable positioning device 100 and the coordinate corresponding to the positioning signal is less than or equal to the threshold value. It should be noted that the positioning signal is prone to offset and cause misjudgment of the positioning signal due to that the positioning signal of the positioning device 3 located on the water surface is easily interfered by the reflection signal on the water surface. Therefore, the threshold value is set to reduce the interference of the reflection signal on the water surface and is dynamically adjusted according to the acceleration signal and the angular velocity signal to adapt to the different reasonable movement ranges of the wearable positioning device 100.

In step S11, when determining that the distance between the current coordinate of the wearable positioning device 100 and the coordinate corresponding to the positioning signal is less than or equal to the threshold value, the processor 4 determines that the positioning signal is within the reasonable movement range of the wearable positioning device 100 and updates the current coordinate with the positioning signal.

In one embodiment, it is assumed that the swimmer's current coordinate (x, y) is (0.35, 0.1), the time that the wearable positioning device 100 is in the above-water mode is from the 5th to the 6th second, and the coordinate corresponding to the positioning signal received by the positioning device 3 is (0.8, 0.4). Thus, the processor 4 updates the coordinate (0.8, 0.4) corresponding to the positioning signal received by the positioning device 3 to the swimmer's current coordinate when determining that the distance between the current coordinate and the coordinate corresponding to the positioning signal is less than the threshold value. In addition, it should be noted that after determining the swimmer's current coordinate (0.8, 0.4) and the coordinate (0, 0) corresponding to the previous positioning signal, the processor 4 can obtain the actual acceleration constant value (0.8, 0.4) of the swimmer's swimming posture (breaststroke) according to the distance and time between the two coordinates, wherein the obtained actual acceleration constant value (0.8, 0.4) can be used as the basis for determining the swimming posture next time. In other words, the acceleration constant value of the swimming posture can be dynamically modified in response to the swimmer's speed.

In step S13, when determining that the distance between the current coordinate of the wearable positioning device 100 and the coordinate corresponding to the positioning signal is greater than the threshold value and therefore the positioning signal exceeds the reasonable movement range of the wearable positioning device 100, the processor 4 will not update the current coordinate with the current positioning signal, and determines that whether the distance between the coordinate corresponding to the new positioning signal and the current coordinate is less than or equal to the threshold value after receiving the new positioning signal from the positioning device 3 again. That is, the current coordinate is updated with the new positioning signal when the distance is less than or equal to the threshold value; alternatively, the current coordinate is not updated with the new positioning signal when the distance is greater than the threshold value, until it is determined that the distance between the current coordinate and the coordinate corresponding to the new positioning signal is less than or equal to the threshold value to update the current coordinate with this positioning signal. In other words, when the processor 4 determines that the distance between the current coordinate of the wearable positioning device 100 and the coordinate corresponding to the positioning signal is greater than the threshold value, the steps S7, S9, S11 and S13 are performed repeatedly until it is determined that the distance between the current coordinate of the wearable positioning device 100 and the coordinate corresponding to the positioning signal is less than or equal to the threshold value.

In addition, in one embodiment, when the wearable positioning device 100 is worn for a water activity, the communication device 6 of the wearable positioning device 100 can transmit the positioning coordinate of the wearable positioning device 100 to the cloud server of the organizer of the water activity. Thus, the organizer can know the location of the wearable positioning device 100 through the cloud server, so as to improve the safety of engaging in the water activity.

In summary, the present invention uses a pressure sensor to sense that the wearable positioning device is in the above-water mode or the under-water mode. When in the under-water mode, the current coordinate of the wearable positioning device is calculated according to the acceleration signal and the angular velocity signal of the inertial sensor and the swimming posture signal determined by the processor according to the swimming posture determination model. Alternatively, when in the above-water mode, the current coordinate of the wearable positioning device is determined by comparing the distance between the coordinate corresponding to the positioning signal and the current coordinate. That is, the wearable positioning device and method thereof provided by the present invention can be used for real-time positioning on and under the water surface and sending the current coordinate, thereby achieving the effect of improving the safety of swimming enthusiasts engaged in water activities.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wearable positioning device, comprising:
    an inertial sensor, configured to sense an acceleration signal and an angular velocity signal;
    a storage device, configured to store a previous positioning signal and a current coordinate; and
    a processor, electrically connected to the inertial sensor and the storage device and configured to perform the following operations:
        determining whether the wearable positioning device is in one of an under-water mode and an above-water mode according to a pressure sensing signal;
        calculating, when in the under-water mode, a current acceleration and a current direction according to the acceleration signal, the angular velocity signal, and a swimming posture signal representing a swimming posture; and calculating a current positioning signal according to the current acceleration, the current direction and the previous positioning signal, and updating the current coordinate with the current positioning signal.

2. The wearable positioning device according to claim 1, the processor is further configured to perform the following operations:

receiving, when in the above-water mode, a first positioning signal and calculating a distance between the current coordinate and a coordinate corresponding to the first positioning signal; and determining whether the distance is less than or equal to a threshold value, and updating the current coordinate with the first positioning signal when the distance is less than or equal to the threshold value.

3. The wearable positioning device according to claim 2, wherein the current coordinate is not updated by the first positioning signal when the distance is greater than the threshold value.

4. The wearable positioning device according to claim 2, wherein the processor is configured to calculate the distance according to the acceleration signal and the angular velocity signal.

5. The wearable positioning device according to claim 1, wherein the processor is configured to use the acceleration signal, the angular velocity signal and the corresponding swimming posture as training data to generate a swimming posture determination model, and use the swimming posture determination model to determine the swimming posture to generate the swimming posture signal representing the swimming posture.

6. The wearable positioning device according to claim 1, further comprising:

a pressure sensor, electrically connected to the processor and configured to sense the pressure sensing signal and transmit the pressure sensing signal to the processor.

7. The wearable positioning device according to claim 1, further comprising:

a communication device, electrically connected to the processor and configured to transmit the current coordinate to a cloud server.

8. A wearable positioning method suitable for a wearable positioning device, the wearable positioning device comprising an inertial sensor, a storage device and a processor, the inertial sensor being configured to sense an acceleration signal and an angular velocity signal, the storage device being configured to store a previous positioning signal and a current coordinate, the processor being electrically connected to the inertial sensor and the storage device, and the wearable positioning method comprising steps of:

determining whether the wearable positioning device is in one of an under-water mode and an above-water mode according to a pressure sensing signal;

calculating, when in the under-water mode, a current acceleration and a current direction according to the acceleration signal, the angular velocity signal, and a swimming posture signal representing a swimming posture; and calculating a current positioning signal according to the current acceleration, the current direction and the previous positioning signal, and updating the current coordinate with the current positioning signal.

9. The wearable positioning method according to claim 8, further comprising steps of:

receiving, when in the above-water mode, a first positioning signal and calculating a distance between the current coordinate and a coordinate corresponding to the first positioning signal; and determining whether the distance is less than or equal to a threshold value, and updating the current coordinate with the first positioning signal when the distance is less than or equal to the threshold value.

10. The wearable positioning method according to claim 9, wherein the current coordinate is not updated by the first positioning signal when the distance is greater than the threshold value.

11. The wearable positioning method according to claim 9, wherein the processor is configured to calculate the distance according to the acceleration signal and the angular velocity signal.

12. The wearable positioning method according to claim 8, wherein the processor is configured to use the acceleration signal, the angular velocity signal and the corresponding swimming posture as training data to generate a swimming posture determination model, and use the swimming posture determination model to determine the swimming posture to generate the swimming posture signal representing the swimming posture.

13. The wearable positioning method according to claim 8, wherein the wearable positioning device further comprises a pressure sensor, electrically connected to the processor and configured to sense the pressure sensing signal and transmit the pressure sensing signal to the processor.

14. The wearable positioning method according to claim 8, wherein the wearable positioning device further comprises a communication device, electrically connected to the processor and configured to transmit the current coordinate to a cloud server.

* * * * *